(12) United States Patent
Chen et al.

(10) Patent No.: US 12,009,546 B2
(45) Date of Patent: Jun. 11, 2024

(54) BATTERY MODULE AND BATTERY PACK

(71) Applicant: CONTEMPORARY AMPEREX TECHNOLOGY CO., LIMITED, Fujian (CN)

(72) Inventors: Xingdi Chen, Fujian (CN); Kaijie You, Fujian (CN); Yu Tang, Fujian (CN); Yuepan Hou, Fujian (CN); Ziyuan Li, Fujian (CN); Jun Ma, Fujian (CN)

(73) Assignee: CONTEMPORARY AMPEREX TECHNOLOGY CO., LIMITED, Ningde (CN)

(*) Notice: Subject to any disclaimer, the term of this patent is extended or adjusted under 35 U.S.C. 154(b) by 656 days.

(21) Appl. No.: 17/125,436

(22) Filed: Dec. 17, 2020

(65) Prior Publication Data

US 2021/0104804 A1   Apr. 8, 2021

Related U.S. Application Data

(63) Continuation of application No. PCT/CN2019/121030, filed on Nov. 26, 2019.

(30) Foreign Application Priority Data

Dec. 30, 2018   (CN) .......................... 201822275432.X (51) Int. Cl.
  *H01M 50/507*   (2021.01)
  *H01M 50/209*   (2021.01)
  (Continued)

(52) U.S. Cl.
  CPC ....... *H01M 50/507* (2021.01); *H01M 50/209* (2021.01); *H01M 50/264* (2021.01);
  (Continued)

(58) Field of Classification Search
  CPC .. H01M 50/507; H01M 50/209; H01M 50/54; H01M 50/55; H01M 50/536
  (Continued)

(56) References Cited

U.S. PATENT DOCUMENTS

2011/0287298 A1   11/2011   Park et al.
2011/0300433 A1   12/2011   Kim
(Continued)

FOREIGN PATENT DOCUMENTS

CN   207818733 U   9/2018
CN   207818750 U   9/2018
(Continued)

*Primary Examiner* — James M Erwin
(74) *Attorney, Agent, or Firm* — Scully, Scott, Murphy & Presser, P.C.

(57) ABSTRACT

The present application relates to a battery module and a battery pack, the battery module including a battery cell arrangement structure, bus bars and a fixing plate, where the battery cell arrangement structure includes a plurality of battery cells; the plurality of battery cells are electrically connected by means of a plurality of the bus bars to form a first output electrode of the battery module and a second output electrode of the battery module, and the first output electrode of the battery module and the second output electrode of the battery module are arranged at a same end of the battery module along a horizontal direction; the fixing plate is provided with an insulating portion, and at least a part of the insulating portion is located between the first output electrode of the battery module and the second output electrode of the battery module.

18 Claims, 6 Drawing Sheets

(51) Int. Cl.
  *H01M 50/264* (2021.01)
  *H01M 50/296* (2021.01)
  *H01M 50/50* (2021.01)
  *H01M 50/536* (2021.01)
  *H01M 50/54* (2021.01)
  *H01M 50/55* (2021.01)

(52) U.S. Cl.
  CPC ......... *H01M 50/296* (2021.01); *H01M 50/50* (2021.01); *H01M 50/536* (2021.01); *H01M 50/54* (2021.01); *H01M 50/55* (2021.01)

(58) Field of Classification Search
  USPC ........................................................ 429/163
  See application file for complete search history.

(56) References Cited

U.S. PATENT DOCUMENTS

| | | | |
|---|---|---|---|
| 2012/0114985 A1* | 5/2012 | Kim | H01M 10/647 429/159 |
| 2012/0251873 A1 | 10/2012 | Miyawaki et al. | |
| 2016/0104873 A1* | 4/2016 | Smythe | H01M 50/264 429/90 |
| 2017/0263910 A1* | 9/2017 | Kobayashi | H01M 50/51 |
| 2018/0026243 A1* | 1/2018 | Stojanovic | B60L 58/21 429/99 |
| 2018/0062223 A1* | 3/2018 | Murata | H01M 10/6571 |
| 2018/0175339 A1* | 6/2018 | Motohashi | H01M 50/342 |
| 2018/0175357 A1* | 6/2018 | Lin | H01M 50/645 |
| 2018/0212207 A1* | 7/2018 | Mino | H01M 10/647 |
| 2018/0241094 A1* | 8/2018 | Hinterberger | H01M 50/209 |

FOREIGN PATENT DOCUMENTS

| | | |
|---|---|---|
| CN | 208062147 U | 11/2018 |
| CN | 209249578 U | 8/2019 |
| EP | 2 388 845 A1 | 11/2011 |
| EP | 2 393 140 A1 | 12/2011 |
| JP | 2001-155789 A | 6/2001 |
| JP | 2012054121 A | 3/2012 |

\* cited by examiner

BATTERY MODULE AND BATTERY PACK

CROSS-REFERENCE TO RELATED APPLICATIONS

This application is a continuation of International Application No. PCT/CN2019/121030, filed on Nov. 26, 2019, which claims priority to Chinese Patent Application No. 201822275432.X, filed on Dec. 30, 2018. Both of the aforementioned applications are hereby incorporated by reference in their entireties.

TECHNICAL FIELD

Some of embodiments of the present application relate to the technical field of energy storage devices, and in particular to a battery module and a battery pack.

BACKGROUND

In recent years, in order to increase the energy density of a battery module, a first output electrode and a second output electrode of the battery module are usually arranged on the same side of the battery module, such that the wiring of the battery module is easy and tidy.

SUMMARY

To this end, an object of some of embodiments of the present application is to provide a battery module and a battery pack to solve the technical problems of the prior art.

Some of the embodiments of the present application provide a battery module including:

a battery cell arrangement structure, wherein the battery cell arrangement structure includes a first battery cell arrangement structure and a second battery cell arrangement structure, the first battery cell arrangement structure and the second battery cell arrangement structure both include a plurality of battery cells arranged along a horizontal direction, and the first battery cell arrangement structure and the second battery cell arrangement structure are arranged along a vertical direction;

a plurality of bus bars connected to the plurality of battery cells, wherein the plurality of battery cells are electrically connected by means of the plurality of bus bars to form a first output electrode of the battery module and a second output electrode of the battery module, and the first output electrode of the battery module and the second output electrode of the battery module are arranged at a same end of the battery module along the horizontal direction; and a fixing plate, wherein the fixing plate is located on a side of the battery cell arrangement structure along the horizontal direction, the fixing plate is provided with an insulating portion, and at least a part of the insulating portion is located between the first output electrode of the battery module and the second output electrode of the battery module to separate the first output electrode of the battery module from the second output electrode of the battery module.

In some embodiments, the insulating portion includes a protrusion, the protrusion is arranged on a surface of the fixing plate facing away from the battery cell arrangement structure, and the protrusion protrudes in a direction away from the battery cell arrangement structure.

In some embodiments, the surface of the fixing plate facing away from the battery cell arrangement structure is provided with a recess, at least a portion of the first output electrode of the battery module and at least a portion of the second output electrode of the battery module are accommodated in the recess, the insulating portion includes a protrusion, and the protrusion is arranged at a bottom wall of the recess and protrudes in the direction away from the battery cell arrangement structure. The structure of the recess in the fixing plate can be eliminated, thus reducing the thickness of the fixing plate and reducing costs.

In some embodiments, the first output electrode of the battery module includes a first output body electrically connected to an electrode terminal of one of the battery cells and a first bended portion connected to the first output body, and the first bended portion is bended in a direction close to the fixing plate, such that an angle is formed between the first output body and the first bended portion;

the second output electrode of the battery module includes a second output body electrically connected to an electrode terminal of another one of the battery cells and a second bended portion connected to the second output body, and the second bended portion is bended in a direction close to the fixing plate, such that an angle is formed between the second output body and the second bended portion;

at least a part of the insulating portion is located between the first bended portion and the second bended portion.

In some embodiments, the first bended portion is provided with a first through hole, the battery module further includes a bolt for the first output electrode and a nut for the first output electrode, and the bolt for the first output electrode is fixed to the nut for the first output electrode through the first through hole;

the second bended portion is provided with a second through hole, the battery module further includes a bolt for the second output electrode and a nut for the second output electrode, and the bolt for the second output electrode is fixed to the nut for the second output electrode through the second through hole.

In some embodiments, a material of the fixing plate is resin, and the nut for the first output electrode and the nut for the second output electrode are fixed to the fixing plate by way of integral injection molding.

In some embodiments, the insulating portion protrudes from the first output body and the second output body, such that at least a part of the insulating portion is located between the first output body and the second output body.

In some embodiments, the battery cell includes an electrode assembly and a battery housing, the electrode assembly is accommodated in the battery housing, and the electrode assembly includes a first electrode sheet, a second electrode sheet and a membrane arranged between the first electrode sheet and the second electrode sheet;

the electrode assembly is of a coiled structure and is flat, an outer surface of the electrode assembly includes two flat surfaces, and the two flat surfaces face each other along the vertical direction; or the electrode assembly is of a laminated structure, and the first electrode sheet, the membrane and the second electrode sheet are laminated in the vertical direction.

In some embodiments, electrode terminals of the plurality of battery cells of the first battery cell arrangement structure and electrode terminals of the plurality of battery cells of the second battery cell arrangement structure are all arranged on a same side of the battery module.

In the above technical solution, the fixing plate is provided and the fixing plate is provided with the insulating portion, and at least a part of the insulating portion is located between the first output electrode of the battery module and the second output electrode of the battery module to separate the first output electrode of the battery module from the second output electrode of the battery module. In this way, by separating the first output electrode of the battery module from the second output electrode of the battery module by the insulating portion, a short-circuit between the first output electrode and the second output electrode is prevented. In addition, the creepage distance between the first output electrode and the second output electrode is increased, thus improving the safety of the battery module.

Some embodiments of the present application also provide a battery pack including:

a case, and a plurality of battery modules as described above in any one of the aspects provided by the inventor.

In the above technical solution, the fixing plate is provided and the fixing plate is provided with the insulating portion, and at least a part of the insulating portion is located between the first output electrode of the battery module and the second output electrode of the battery module to separate the first output electrode of the battery module from the second output electrode of the battery module. In this way, by separating the first output electrode of the battery module from the second output electrode of the battery module by the insulating portion, a short-circuit between the first output electrode and the second output electrode is prevented. In addition, the creepage distance between the first output electrode and the second output electrode is increased, thus improving the safety of the battery module.

LIST OF REFERENCE NUMERALS

1. First battery cell arrangement structure,
11. Battery cell,
111. Electrode assembly,
1111. Flat surface,
1112. First electrode sheet,
1113. Second electrode sheet,
1114. Membrane,
112. Battery housing,
1121. Internal space,
1122. Opening,
113. Electrode terminal connector,
114. Cover plate,
115. Electrode terminal,
2. Second battery cell arrangement structure,
3. Bus bar,
4. Fixing plate,
41. Protrusion,
42. Recess,
43. Insulating portion,
5. First output electrode,
51. First output body,
52. First bended portion,
521. First through hole,
53. Bolt for first output electrode,
6. Second output electrode,
61. Second output body,
62. Second bended portion,
621. Second through hole,
63. Bolt for second output electrode,
7. Battery module,
8. Upper case cover,
9. Lower case body.

DESCRIPTION OF EMBODIMENTS

In order to describe technical contents, structural features, achieved objectives and effects of technical solution in detail, the following detailed description will be given in conjunction with specific embodiments and accompanying drawings.

In the description of the embodiments of the present application, unless clearly specified and defined otherwise, the terms "first" and "second" are only used for descriptive purposes, and cannot be understood as indicating or implying relative importance; unless specified or stated otherwise, the term "plurality" means two or more; and the terms "connection", "fixing", etc. should be understood in a broad sense, for example, "connection" may be a fixed connection, a detachable connection, an integral connection, or an electrical connection; and may be a direct connection or an indirect connection via an intermediate medium. A person of ordinary skill in the art may understand the specific meanings of the foregoing terms in the various embodiments of the present application according to specific circumstances.

In the description of the various embodiments of the present application, throughout the drawings, the direction indicated by an arrow x is a length direction, the direction indicated by an arrow y is a width direction, and the direction indicated by an arrow z is a vertical direction. The horizontal direction is a direction parallel to a horizontal plane, and may be the aforementioned length direction or the aforementioned width direction. In addition, the horizontal direction includes not only a direction absolutely parallel to the horizontal plane, but also a direction substantially parallel to the horizontal plane as conventionally perceived in engineering. The vertical direction is a direction perpendicular to the horizontal plane, and the vertical direction includes not only a direction absolutely perpendicular to the horizontal plane, but also a direction substantially perpendicular to the horizontal plane as conventionally perceived in engineering.

At present, in order to increase the energy density of a battery module, a first output electrode and a second output electrode of the battery module are usually arranged on the same side of the battery module, such that the wiring of the battery module is easy and tidy. However, in the above arrangement, the first output electrode is located close to the second output electrode of the battery module, and the risk of a short circuit between the first output electrode and the second output electrode is likely to occur during the assembly of the battery module.

Figure 1:
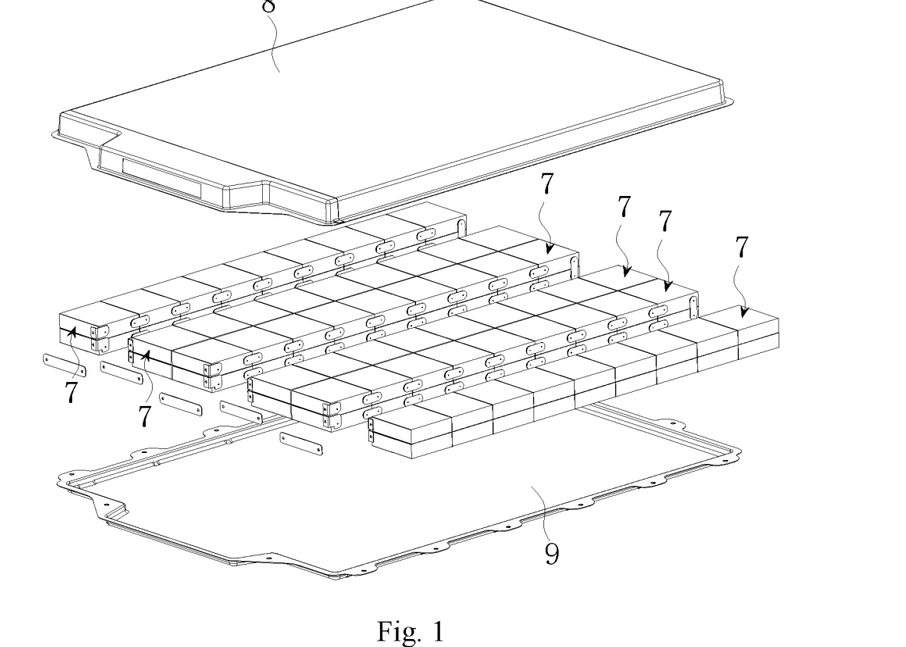
FIG. 1 is a schematic structural diagram of a battery pack.

In view of this, referring to FIG. 1, some of the embodiments of the present application relate to a battery pack including a case and a plurality of battery modules 7 arrange inside the case. The case includes an upper case cover 8 and a lower case body 9, and the upper case cover 8 and the lower case body 9 are configured to be sealed.

Figure 2:
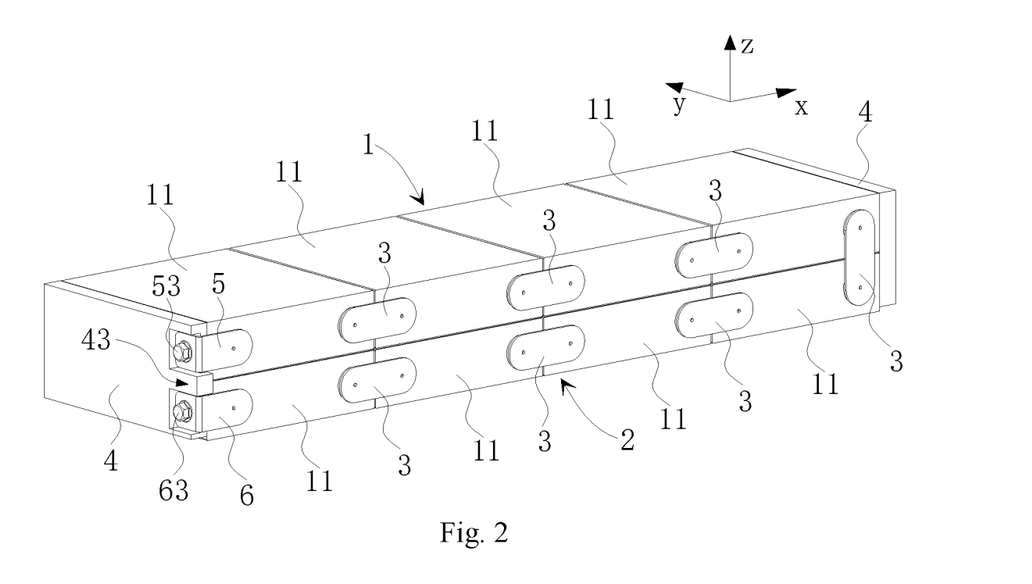
FIG. 2 is a schematic structural diagram of a battery module after being fixed.
Figure 3:
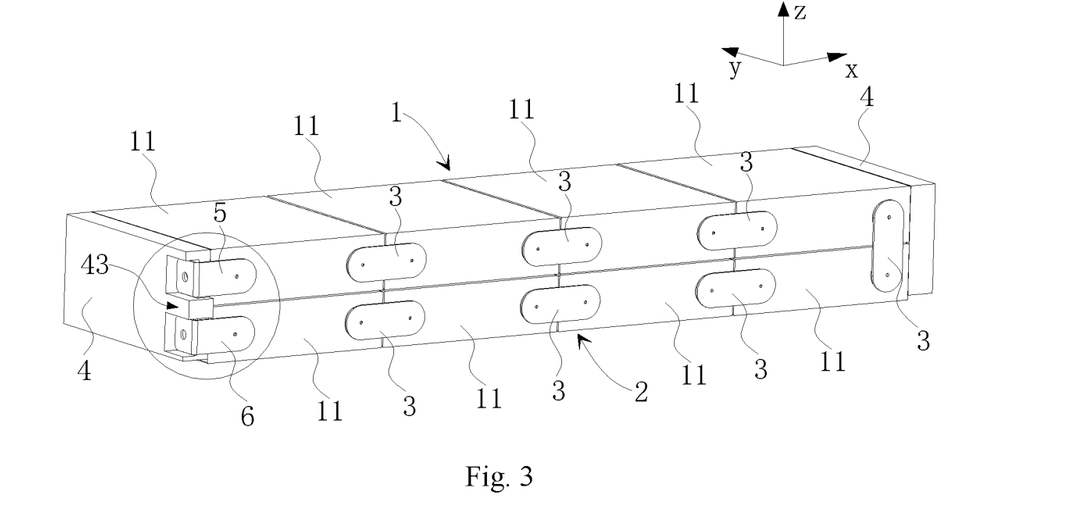
FIG. 3 is a schematic structural diagram of the battery module before being fixed.

As shown in FIGS. 2 and 3, in some of the embodiments, the battery module 7 includes a battery cell arrangement structure, a plurality of bus bars 3 and a fixing plate 4, wherein the battery cell arrangement structure includes a first battery cell arrangement structure 1 and a second battery cell arrangement structure 2, the first battery cell arrangement structure 1 and the second battery cell arrangement structure 2 both include a plurality of battery cells 11 arranged along a horizontal direction (for example, the length direction indicated by the arrow x), and the first battery cell arrangement structure 1 and the second battery cell arrangement structure 2 are arranged along a vertical direction (the direction as indicated by the arrow z). In other embodiments, the battery module may further include a third battery cell arrangement structure and a fourth battery cell arrangement structure, etc. arranged along the vertical direction (the direction as indicated by the arrow z), and the number of the arrangements of the battery cell arrangement structure is not limited.

In addition, in some of the embodiments, as shown in FIG. 3, the plurality of battery cells 11 are electrically connected by the plurality of bus bars 3, wherein the plurality of battery cells 11 are connected in series by the plurality of bus bars 3 to from a first output electrode 5 of the battery module and a second output electrode 6 of the battery module. The first output electrode 5 of the battery module and the second output electrode 6 of the battery module are arranged at the same end of the battery module along the horizontal direction (for example, the length direction indicated by the arrow x). In other embodiments, the plurality of battery cells 11 may be connected in parallel or in parallel-series by the bus bars 3.

Figure 7:
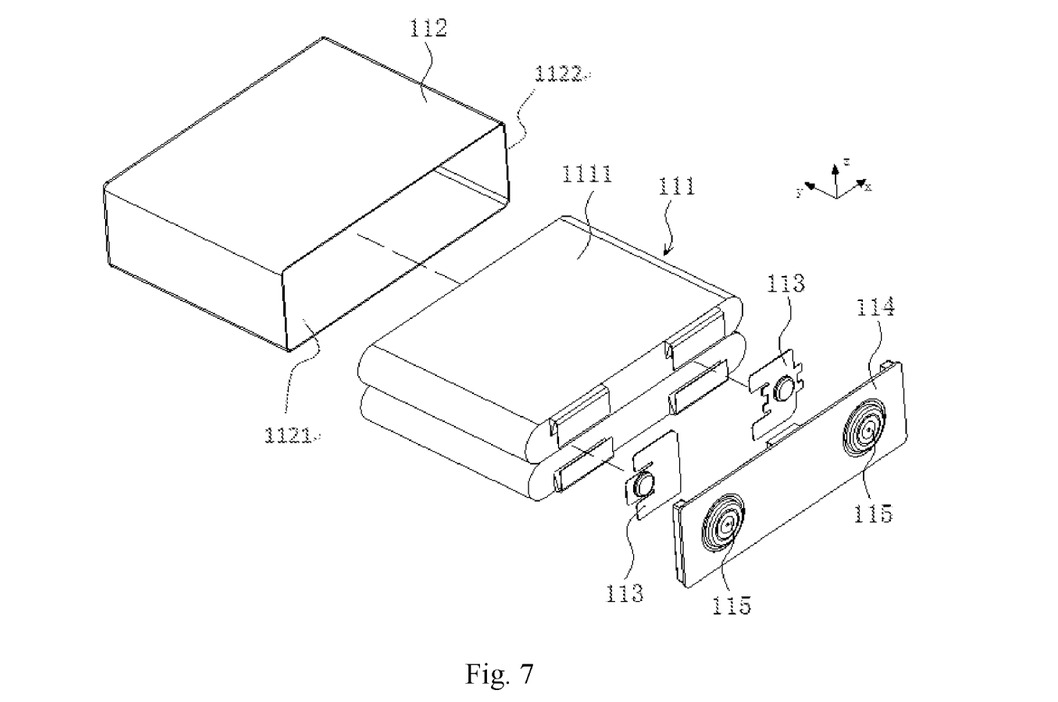
FIG. 7 is an exploded view of the battery module.

In addition, in some of the embodiments, as shown in FIG. 7, electrode terminals 115 of the plurality of battery cells 11 of the first battery cell arrangement structure 1 and electrode terminals 115 of the plurality of battery cells 11 of the second battery cell arrangement structure 2 are all arranged on the same side of the battery module. Specifically, all the electrode terminals 115 of the first battery cell arrangement structure 1 and all the electrode terminals 115 of the second battery cell arrangement structure 2 are arranged on a side of the battery module along the width direction (the direction indicated by the arrow y).

In addition, the fixing plate 4 in some of the embodiments is located on a side of the battery cell arrangement structure along the horizontal direction (for example, the length direction indicated by the arrow x), as shown in FIG. 3. the fixing plate 4 is provided with an insulating portion 43, and at least a part of the insulating portion 43 is located between the first output electrode 5 of the battery module and the second output electrode 6 of the battery module to separate the first output electrode 5 of the battery module from the second output electrode 6 of the battery module.

Also, in some of the embodiments, there may be two fixing plates 4, and the two fixing plate 4 are respectively located on either side of the battery cell arrangement structure along the horizontal direction (for example, the length direction indicated by the arrow x).

Specifically, the fixing plate 4 in some of the embodiments is insulating. The fixing plate 4 itself may be made of an insulating material; alternatively, the interior of the fixing plate 4 is electrically conductive, and an insulating layer is provided on the surface of the fixing plate 4.

In addition, in some of the embodiments, the battery cell arrangement structure is provided with a fixing plate 4 at each end thereof, and the fixing plate 4 is used for fixing the battery cells 11, the first output electrode 5, and the second output electrode 6. In some embodiments, the number of the fixing plates 4 can be one, or even the fixing plates 4 may be eliminated. The plurality of battery cells 11 may be fixed by way of a tie or a fixing frame, and the first output electrode 5 and the second output electrode 6 may be directly fixed on the fixing frame.

Figure 4:
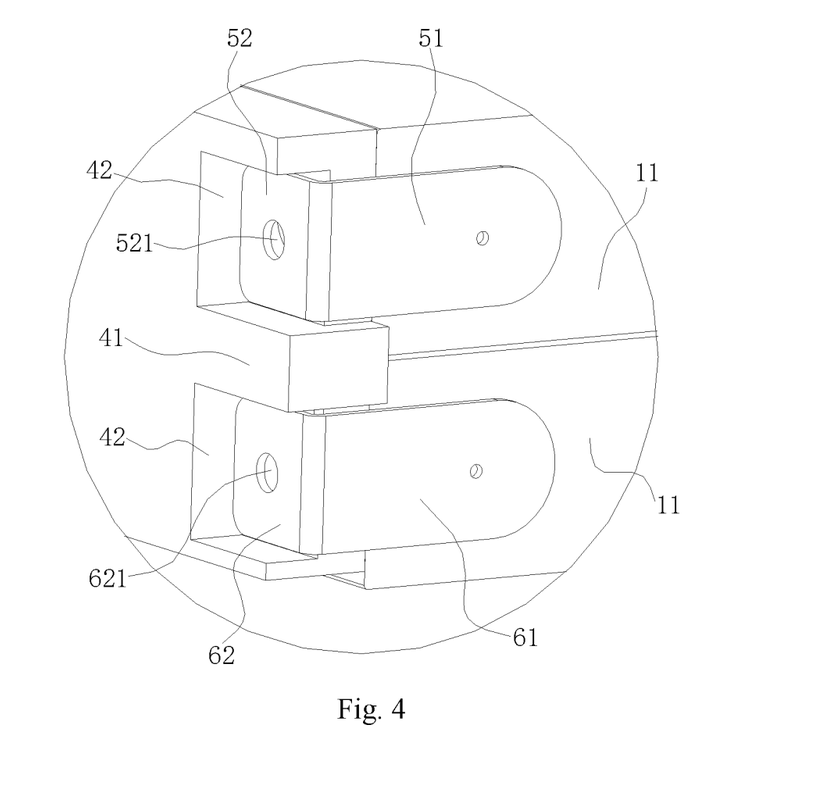
FIG. 4 is an enlarged view of a portion A in FIG. 3.

In addition, in some of the embodiments, as shown in FIG. 4, the first output electrode 5 of the battery module includes a first output body 51 electrically connected to an electrode terminal 115 of one of the battery cells (11) and a first bended portion 52 connected to the first output body 51, and the first bended portion 52 is bended in a direction close to the fixing plate 4, such that an angle is formed between the first output body 51 and the first bended portion 52. The first bended portion 52 is substantially perpendicular to the first output body 51, so as to reduce the internal space of the battery pack occupied by the first bended portion 52 and increase the energy density.

As shown in FIG. 4, in some of the embodiments, the second output electrode 6 of the battery module includes a second output body 61 electrically connected to an electrode terminal 115 of another one of the battery cells 11 and a second bended portion 62 connected to the second output body 61, and the second bended portion 62 is bended in a direction close to the fixing plate 4, such that an angle is formed between the second output body 61 and the second bended portion 62.

In addition, in some of the embodiments, as shown in FIGS. 3 and 4, the second bended portion 62 is substantially perpendicular to the second output body 61, so as to reduce the internal space of the battery pack occupied by the second bended portion 62 and increase the energy density. At least a part of the insulating portion 43 is located between the first bended portion 52 and the second bended portion 62. In some of the embodiments, a surface of the insulating portion 43 away from the battery cell arrangement structure goes beyond a surface of the first bended portion 52 away from the battery cell arrangement structure and a surface of the second bended portion 62 away from the battery cell arrangement structure, so as to further improve the safety of the battery module.

Figure 5:
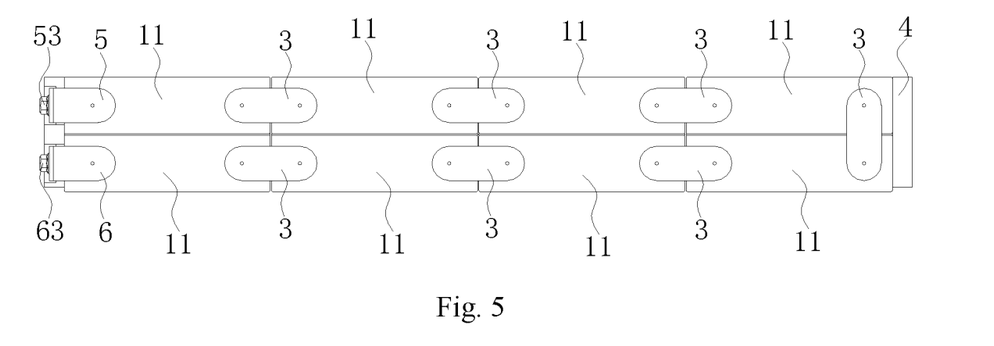
FIG. 5 is a front view of the battery module.
Figure 6:
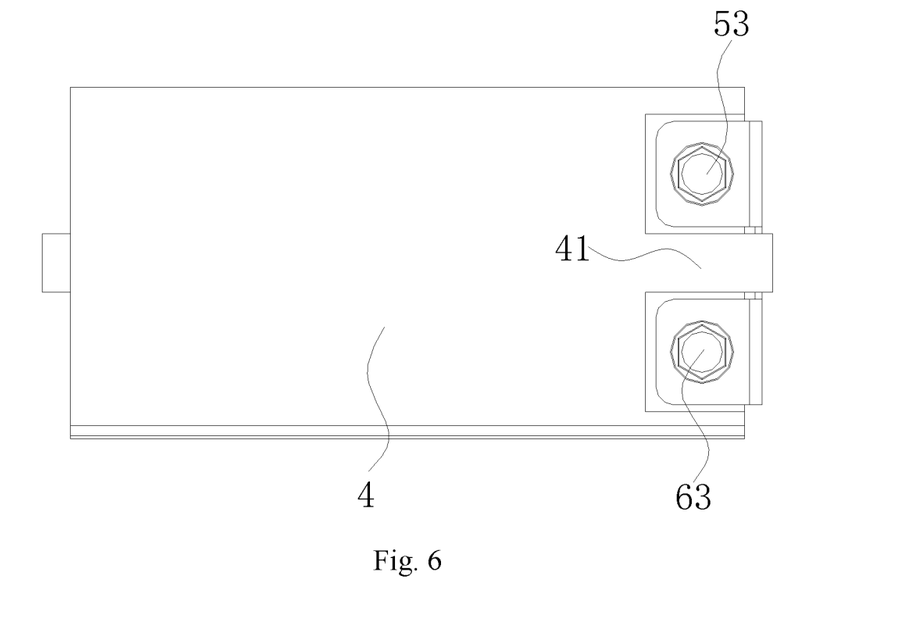
FIG. 6 is a side view of the battery module.

In addition, as shown in FIGS. 4 and 5, in some of the embodiments, the first bended portion 52 is provided with a first through hole 521, and as shown in FIG. 6, the battery module 7 further includes a bolt 53 for the first output electrode and a nut for the first output electrode, and the bolt 53 for the first output electrode is fixed to the nut for the first output electrode through first through hole 521. The second bended portion 62 is provided with a second through hole 621, and the battery module 7 further includes a bolt 63 for the second output electrode and a nut for the second output electrode (not illustrated), and the bolt 63 for the second output electrode is fixed to the nut for the second output electrode (not illustrated) through the second through hole 621 (the fixed battery module as shown in FIG. 1, and the battery module before fixing as shown in FIG. 2).

Also, in some of the embodiments, the material of the fixing plate 4 is resin, and the nut for the first output electrode and the nut for the second output electrode are fixed to the fixing plate 4 by way of integral injection molding. In this case, through cooperation of the bolt 53 for the first output electrode and the nut for the first output electrode and the cooperation of the bolt 63 for the second output electrode and the nut for the second output electrode, the first output electrode 5 and the second output electrode 6 are easily removed.

In addition, in some of the embodiments, as shown in FIG. 4, the first output electrode 5 may be provided with only the first output body 51 extending in the direction close to the fixing plate 4, the second output electrode 6 may be provided with only the second output body 61 extending in the direction close to fixing plate 4, and the first output body 51 and the second output body 61 are respectively fixed to the fixing plate 4 by means of a bolt.

In addition, in some of the embodiments, as shown in FIGS. 3, 5 and 6, the insulating portion 43 protrudes from the first output body 51 and the second output body 61, such that at least a part of the insulating portion 43 is located between the first output body 51 and the second output body 61.

Figure 8:
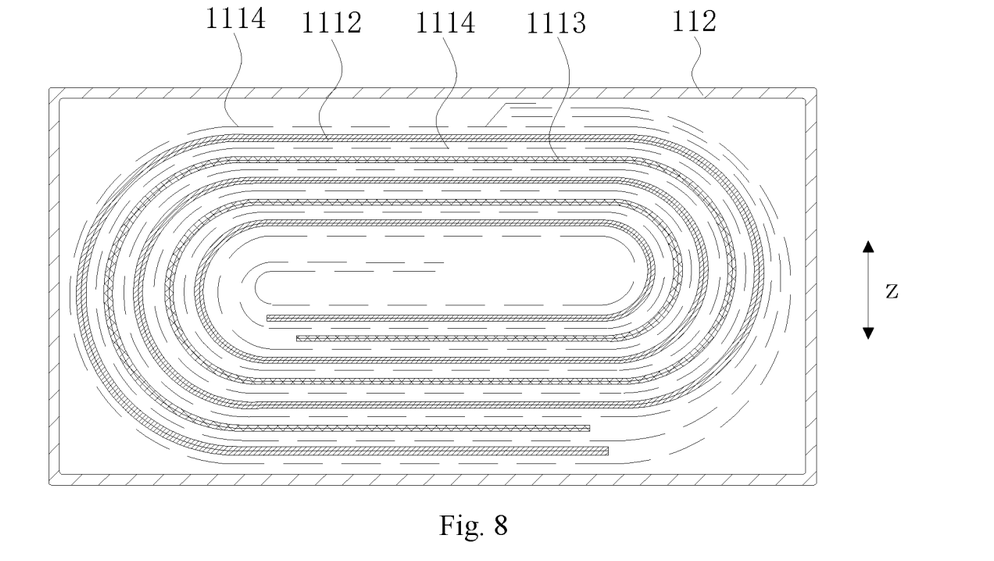
FIG. 8 is a cross-sectional view of an electrode assembly of a coiled structure.
Figure 9:
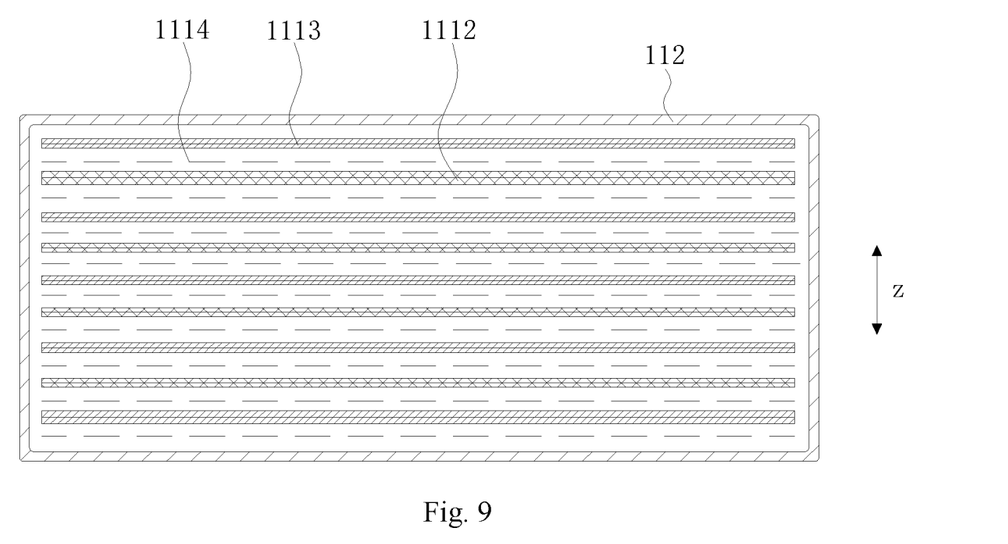
FIG. 9 is a cross-sectional view of the electrode assembly of a laminated structure.

As shown in FIGS. 7 to 9, in some of the embodiments, the battery cell 11 includes an electrode assembly 111, a battery housing 112, an electrode terminal connector 113 and a cover plate 114, and the battery housing 112 may have a hexahedral shape or other shapes. The battery housing 112 has an internal space 1121 for accommodating the electrode assembly 111 and an electrolytic solution, and the battery housing 112 has an opening 1122. The electrode assembly 111 is accommodated inside the battery housing 112, and the cover plate 114 covers the opening 1122 and is connected to the battery housing 112 in a sealed manner. The battery housing 112 and the cover plate 114 may be made of materials such as aluminum, aluminum alloy or plastic.

The electrode assembly 111 includes a first electrode sheet 1112, a second electrode sheet 1113 and a membrane 1114 arranged between the first electrode sheet 1112 and the second electrode sheet 1113. As shown in FIG. 9, the electrode assembly 111 of a laminated structure may be formed by laminating in sequence the first electrode sheet 1112, the second electrode sheet 1113 and the membrane 1114. Alternatively, as shown in FIG. 8, the first electrode sheet 1112, the second electrode sheet 1113 and the membrane 1114 are laminated and then are coiled, thus forming the electrode assembly 111 of a coiled structure.

The membrane 1114 is an insulator between the first electrode sheet 1112 and the second electrode sheet 1113. By way of example, the first electrode sheet 1112 acts as a positive electrode sheet, and the second electrode sheet 1113 acts as a negative electrode sheet for description. Likewise, the first electrode sheet 1112 may also be the negative electrode sheet, and the second electrode sheet 1113 may be the positive electrode sheet. In addition, a positive electrode active material is coated on a coated region of the positive electrode sheet, and a negative electrode active material is coated on a coated region of the negative electrode sheet. An uncoated region extending from the coated region serves as an electrode tab, and the electrode assembly 111 includes two electrode tabs, i.e. a positive electrode tab and a negative electrode tab. The positive electrode tab extends from the coated region of the positive electrode sheet; and the negative electrode tab extends from the coated region of the negative electrode sheet. There are two electrode terminal connectors 113, i.e. one positive electrode terminal connector 113, and one negative electrode terminal connector 113. The positive electrode tab and the positive electrode terminal 115 are electrically connected by means of the positive electrode terminal connector 113, and the negative electrode tab and the negative electrode terminal 115 are electrically connected by means of the negative electrode terminal connector 113.

As shown in FIGS. 7 and 8, in some of the embodiments, in the case of the electrode assembly 111 of the coiled structure, the electrode assembly 111 is flat, the outer surface of the electrode assembly 111 includes two flat surfaces 1111, and the two flat surfaces 1111 face each other along the vertical direction (the direction as indicated by the arrow z). The electrode assembly 111 is of a generally hexahedral structure, and the flat surfaces 1111 are substantially parallel to a coiling axis and is the outer surfaces with the largest area. The flat surfaces 1111 may be relatively even surfaces, and are not required to be perfectly planar.

As shown in FIG. 9, in the case of the electrode assembly 111 of the laminated structure, the first electrode sheet 1112, the membrane 1114 and the second electrode sheet 1113 are laminated in the vertical direction (the direction as indicated by the arrow z).

The electrode assembly 111 will inevitably expand in the thickness direction of the first electrode sheet 1112 during charging and discharging (in the electrode assembly 111 of the coiled structure, an expansion force in the direction perpendicular to the flat surfaces 1111 is maximum; and in the electrode assembly 111 of the laminated structure, an expansion force in the arrangement direction of the first electrode sheet 1112 and the second electrode sheet 1113 is maximum). In some of the embodiments, the flat surfaces 1111 of the electrode assembly 111 of the coiled structure is in the vertical direction (the direction as indicated by the arrow z); alternatively, the first electrode sheet 1112 and the second electrode sheet 1113 of the electrode assembly 111 of the laminated structure are laminated in the vertical direction (the direction as indicated by the arrow z). It can be seen that no matter whether the electrode assembly 111 adopts the coiled structure or the laminated structure, the direction in which the electrode assembly 111 applies the maximum expansion force to the battery housing 112 is the vertical direction (the direction as indicated by the arrow z).

However, in the prior art, in the battery cells 11 of the battery cell arrangement structure, the direction in which the electrode assembly 111 applies the maximum expansion force to the battery housing 112 is always the horizontal direction (for example, the direction indicated by the arrow x). Since the dimension of the battery module in the horizontal direction (for example, the direction indicated by the arrow X) is much larger than the dimension thereof in the vertical direction (the direction as indicated by the arrow z) (for example, limited by the height of a chassis of a vehicle, more battery cells 11 need to be arranged in the horizontal direction, and the accumulation of expansion force is large), the existing battery cell arrangement structure is subjected to an extremely large expansion force in the horizontal direction (for example, the direction indicated by the arrow X). Therefore, it is necessary to provide a very thick end plate on either side of the battery cell arrangement structure in the horizontal direction to resist the expansion force, and thicker end plates will reduce the energy density of the battery module.

In some of the embodiments of the present application, the direction in which the electrode assembly 111 applies the maximum expansion force to the battery housing 112 is the vertical direction (the direction as indicated by the arrow z), and the number of the battery cells 11 arranged in the vertical direction (the direction as indicated by the arrow z) is small, therefore, compared with the prior art, the maximum expansion force in the battery cell arrangement structure may be greatly reduced.

Figure 10:
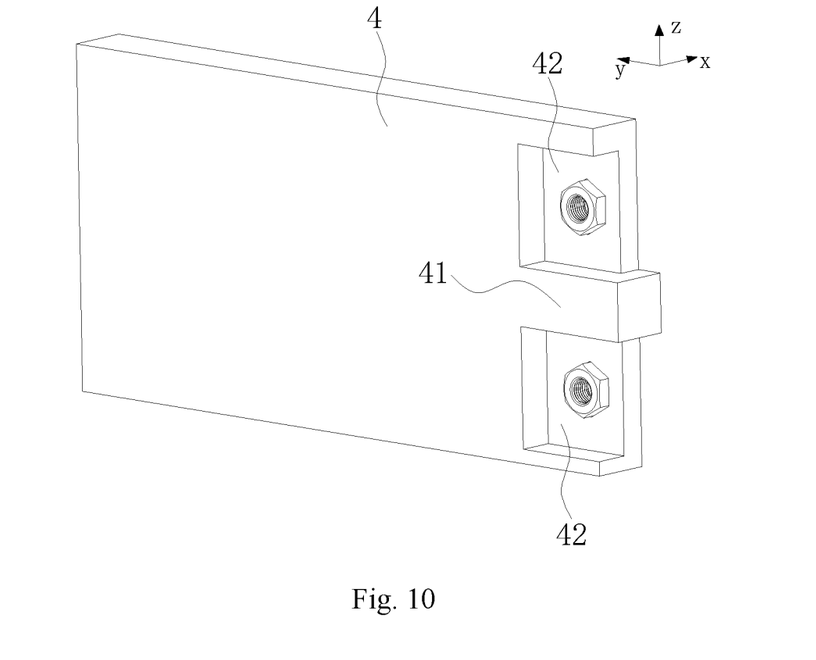
FIG. 10 is a schematic structural diagram of a fixing plate.

As shown in FIGS. 3, 4 and 10, the surface of the fixing plate 4 away from the battery cell arrangement structure is provided with a recess 42, at least a part of the first output electrode 5 of the battery module and at least a part of the second output electrode 6 of the battery module are accommodated in the recess 42, the insulating portion 43 includes a protrusion 41, and the protrusion 41 is provided arranged at a bottom wall of the recess 42 and protrudes in a direction away from the battery cell arrangement structure. The first output electrode 5 of the battery module is separated from the second output electrode 6 of the battery module by the protrusion 41.

Figure 11:
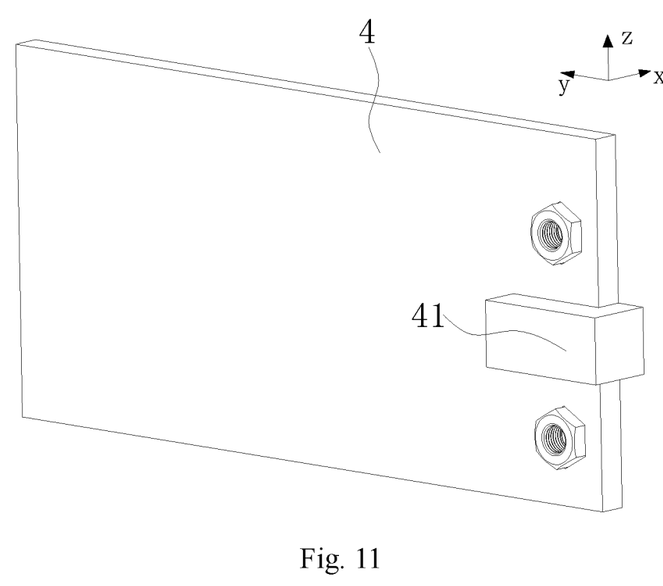
FIG. 11 is a schematic structural diagram of the fixing plate.

As shown in FIG. 11, however, in some of the embodiments, the insulating portion 43 includes the protrusion 41, the protrusion 41 is arranged on the surface of the fixing plate 4 away from the battery cell arrangement structure and protrudes in the direction away from the battery cell arrangement structure. In this case, the structure of the recess 42 in the fixing plate 4 may be eliminated, thus reducing the thickness of the fixing plate 4 and reducing costs.

During assembly, a plurality of battery cells 11 may be respectively arranged in the horizontal direction (for example, the direction indicated by the arrow x) to form the first battery cell arrangement structure 1 and the second battery cell arrangement structure 2, and then the first battery cell arrangement structure 1 is arranged on the second battery cell arrangement structure 2 in the vertical direction (the direction as indicated by the arrow z). The plurality of battery cells 11 are connected in series by the bus bars 3 to form the first output electrode 5 of the battery module and the second output electrode 6 of the battery module, the fixing plate 4 is arranged on a side of the plurality of battery cells arrangement structures along the horizontal direction (for example, the direction indicated by the arrow x), and the first output electrode 5 of the battery module and the second output electrode 6 of the battery module are fixed to the fixing plate 4. The first output electrode 5 of the battery module is separated from the second output electrode 6 of the battery module by the insulating portion 43 on the fixing plate 4.

It should be noted that although the foregoing embodiments have been described herein, the scope of protection of the present application is not limited thereby. Therefore, based on the innovative concept of the present application, the changes and modifications made to the embodiments described herein, or the variations of the equivalent structure or equivalent process made by using the description of the present application and the accompanying drawings, and direct or indirect application of the above technical solutions in other related technical fields are all included in the scope of protection of the present application.

What is claimed is:

1. A battery module, comprising:
   a battery cell arrangement structure, wherein the battery cell arrangement structure comprises a first battery cell arrangement structure and a second battery cell arrangement structure, the first battery cell arrangement structure and the second battery cell arrangement structure both comprise a plurality of battery cells arranged along a horizontal direction, and the first battery cell arrangement structure and the second battery cell arrangement structure are arranged along a vertical direction;
   a plurality of bus bars connected to the plurality of battery cells, wherein the plurality of battery cells are electrically connected by means of the plurality of bus bars to form a first output electrode of the battery module and a second output electrode of the battery module, and the first output electrode of the battery module and the second output electrode of the battery module are arranged at a same end of the battery module along the horizontal direction; and
   a fixing plate, wherein the fixing plate is located on a side of the battery cell arrangement structure along the horizontal direction, the fixing plate is provided with an insulating portion, the insulating portion comprises a protrusion, the protrusion is arranged on a surface of the fixing plate facing away from the battery cell arrangement structure, the protrusion protrudes in a direction away from the battery cell arrangement structure, and the protrusion is located between the first output electrode of the battery module and the second output electrode of the battery module to separate the first output electrode of the battery module from the second output electrode of the battery module;
   wherein a surface with the largest area of each the battery cell in the first battery cell arrangement structure is disposed to a surface with the largest area of each the battery cell in the corresponding second battery cell arrangement structure along the vertical direction, the fixing plate is arranged on a side of the first battery cell arrangement structure and a side of the second battery cell arrangement structure, electrode terminals of the first battery cell arrangement structure and electrode terminals of the second battery cell arrangement structure are arranged on a side of the battery module along a width direction, and are arranged on the side of the first battery cell arrangement structure and the side of the second battery cell arrangement structure.

2. The battery module according to claim 1, wherein the surface of the fixing plate facing away from the battery cell arrangement structure is provided with a recess, at least a portion of the first output electrode of the battery module and at least a portion of the second output electrode of the battery module are accommodated in the recess, and the protrusion is arranged at a bottom wall of the recess and protrudes in the direction away from the battery cell arrangement structure.

3. The battery module according to claim 1, wherein the first output electrode of the battery module comprises a first output body electrically connected to an electrode terminal of one of the battery cells and a first bended portion connected to the first output body, and the first bended portion is bended in a direction close to the fixing plate, such that an angle is formed between the first output body and the first bended portion;
   the second output electrode of the battery module comprises a second output body electrically connected to an electrode terminal of another one of the battery cells and a second bended portion connected to the second output body, and the second bended portion is bended in a direction close to the fixing plate, such that an angle is formed between the second output body and the second bended portion;
   and at least a part of the insulating portion is located between the first bended portion and the second bended portion.

4. The battery module according to claim 3, wherein the first bended portion is provided with a first through hole, the battery module further comprises a bolt for the first output electrode and a nut for the first output electrode, and the bolt for the first output electrode is fixed to the nut for the first output electrode through the first through hole;
   and the second bended portion is provided with a second through hole, the battery module further comprises a bolt for the second output electrode and a nut for the second output electrode, and the bolt for the second output electrode is fixed to the nut for the second output electrode through the second through hole.

5. The battery module according to claim 4, wherein a material of the fixing plate is resin, and the nut for the first output electrode and the nut for the second output electrode are fixed to the fixing plate by way of integral injection molding.

6. The battery module according to claim 3, wherein the insulating portion protrudes from the first output body and the second output body, such that at least a part of the insulating portion is located between the first output body and the second output body.

7. The battery module according to claim 1, wherein the battery cell comprises an electrode assembly and a battery housing, the electrode assembly is accommodated in the battery housing, and the electrode assembly comprises a first electrode sheet, a second electrode sheet and a membrane arranged between the first electrode sheet and the second electrode sheet;

and the electrode assembly is of a coiled structure and is flat, an outer surface of the electrode assembly comprises two flat surfaces, and the two flat surfaces face each other along the vertical direction; or the electrode assembly is of a laminated structure, and the first electrode sheet, the membrane and the second electrode sheet are laminated in the vertical direction.

8. The battery module according to claim 1, wherein electrode terminals of the plurality of battery cells of the first battery cell arrangement structure and electrode terminals of the plurality of battery cells of the second battery cell arrangement structure are all arranged on a same side of the battery module.

9. A battery pack, comprising:
a case, and
a plurality of battery modules, each of the battery modules comprising:
a battery cell arrangement structure, wherein the battery cell arrangement structure comprises a first battery cell arrangement structure and a second battery cell arrangement structure, the first battery cell arrangement structure and the second battery cell arrangement structure both comprise a plurality of battery cells arranged along a horizontal direction, and the first battery cell arrangement structure and the second battery cell arrangement structure are arranged along a vertical direction;
a plurality of bus bars connected to the plurality of battery cells, wherein the plurality of battery cells are electrically connected by means of the plurality of bus bars to form a first output electrode of the battery module and a second output electrode of the battery module, and the first output electrode of the battery module and the second output electrode of the battery module are arranged at a same end of the battery module along the horizontal direction; and
a fixing plate, wherein the fixing plate is located on a side of the battery cell arrangement structure along the horizontal direction, the fixing plate is provided with an insulating portion, the insulating portion comprises a protrusion, the protrusion is arranged on a surface of the fixing plate facing away from the battery cell arrangement structure, the protrusion protrudes in a direction away from the battery cell arrangement structure, and the protrusion is located between the first output electrode of the battery module and the second output electrode of the battery module to separate the first output electrode of the battery module from the second output electrode of the battery module;

wherein a surface with the largest area of each the battery cell in the first battery cell arrangement structure is disposed to a surface with the largest area of each the battery cell in the corresponding second battery cell arrangement structure along the vertical direction, the fixing plate is arranged on a side of the first battery cell arrangement structure and a side of the second battery cell arrangement structure, electrode terminals of the first battery cell arrangement structure and electrode terminals of the second battery cell arrangement structure are arranged on a side of the battery module along a width direction, and are arranged on the side of the first battery cell arrangement structure and the side of the second battery cell arrangement structure.

10. The battery pack according to claim 9, wherein the surface of the fixing plate facing away from the battery cell arrangement structure is provided with a recess, at least a portion of the first output electrode of the battery module and at least a portion of the second output electrode of the battery module are accommodated in the recess, and the protrusion is arranged at a bottom wall of the recess and protrudes in the direction away from the battery cell arrangement structure.

11. The battery pack according to claim 9, wherein the first output electrode of the battery module comprises a first output body electrically connected to an electrode terminal of one of the battery cells and a first bended portion connected to the first output body, and the first bended portion is bended in a direction close to the fixing plate, such that an angle is formed between the first output body and the first bended portion.

12. The battery pack according to claim 11, wherein the second output electrode of the battery module comprises a second output body electrically connected to an electrode terminal of another one of the battery cells and a second bended portion connected to the second output body, and the second bended portion is bended in a direction close to the fixing plate, such that an angle is formed between the second output body and the second bended portion;

and at least a part of the insulating portion is located between the first bended portion and the second bended portion.

13. The battery pack according to claim 12, wherein the first bended portion is provided with a first through hole, the battery module further comprises a bolt for the first output electrode and a nut for the first output electrode, and the bolt for the first output electrode is fixed to the nut for the first output electrode through the first through hole;

and the second bended portion is provided with a second through hole, the battery module further comprises a bolt for the second output electrode and a nut for the second output electrode, and the bolt for the second output electrode is fixed to the nut for the second output electrode through the second through hole.

14. The battery pack according to claim 13, wherein a material of the fixing plate is resin, and the nut for the first output electrode and the nut for the second output electrode are fixed to the fixing plate by way of integral injection molding.

15. The battery pack according to claim 11, wherein the insulating portion protrudes from the first output body and the second output body, such that at least a part of the insulating portion is located between the first output body and the second output body.

16. The battery pack according to claim 9, wherein the battery cell comprises an electrode assembly and a battery housing, the electrode assembly is accommodated in the battery housing, and the electrode assembly comprises a first electrode sheet, a second electrode sheet and a membrane arranged between the first electrode sheet and the second electrode sheet.

17. The battery pack according to claim 16, wherein the electrode assembly is of a coiled structure and is flat, an outer surface of the electrode assembly comprises two flat surfaces, and the two flat surfaces face each other along the vertical direction; or the electrode assembly is of a laminated structure, and the first electrode sheet, the membrane and the second electrode sheet are laminated in the vertical direction.

18. The battery pack according to claim 9, wherein electrode terminals of the plurality of battery cells of the first battery cell arrangement structure and electrode terminals of the plurality of battery cells of the second battery cell arrangement structure are all arranged on a same side of the battery module.

\* \* \* \* \*